US011524748B2

(12) United States Patent
Bougie (10) Patent No.: US 11,524,748 B2
(45) Date of Patent: Dec. 13, 2022

(54) SNOWMOBILE FRONT SUSPENSION ARM WITH DISCONNECTABLE INTERMEDIATE SECTION (71) Applicant: Martin Bougie, Val-d'Or (CA)

(72) Inventor: Martin Bougie, Val-d'Or (CA)

( * ) Notice: Subject to any disclaimer, the term of this patent is extended or adjusted under 35 U.S.C. 154(b) by 121 days.

(21) Appl. No.: 17/147,618

(22) Filed: Jan. 13, 2021

(65) Prior Publication Data
US 2022/0219781 A1 Jul. 14, 2022

(51) Int. Cl.
B62M 27/02 (2006.01)

(52) U.S. Cl.
CPC ....... *B62M 27/02* (2013.01); *B60G 2200/144* (2013.01); *B60G 2206/012* (2013.01); *B60G 2206/15* (2013.01); *B60G 2300/322* (2013.01); *B62M 2027/026* (2013.01)

(58) Field of Classification Search
CPC ....... B62M 2027/026; B60G 2206/016; B60G 2300/322; B60G 2206/15; B60G 2206/012; B60G 2200/144
See application file for complete search history.

(56) References Cited

U.S. PATENT DOCUMENTS

| 6,474,662 | B1 | 11/2002 | Cormlcan |
| 6,793,030 | B2 | 1/2004 | Pyykonen |
| 6,942,050 | B1 | 9/2005 | Hondala |
| 7,581,609 | B2 | 9/2009 | Kubota |
| 8,336,660 | B2 | 12/2012 | Ogura |
| 2009/0230650 | A1 * | 9/2009 | Mayen ............. B60G 7/001 280/124.1 |
| 2014/0232081 | A1 * | 8/2014 | Gleason ............ B60G 7/001 280/124.125 |

FOREIGN PATENT DOCUMENTS

EP 2366654 A1 * 9/2011 ............... B62D 7/20

* cited by examiner

*Primary Examiner* — Paul N Dickson
*Assistant Examiner* — Matthew D Lee
(74) *Attorney, Agent, or Firm* — Guy J. Houle; Houle Patent Agency Inc.

(57) ABSTRACT

A suspension arm assembly for supporting at least a section of a recreational vehicle, such as a snowmobile or all-terrain vehicle front end, above a support surface is described. The suspension arm assembly has at least one segmented suspension arm formed by an upper arm section, a lower arm section and an intermediate arm section. The intermediate arm section is interconnected between the upper and lower arm sections by detachable end connectors. The intermediate arm section when impacted by objects in its pathway, when the vehicle is in motion and when damaged by an impact force of a strength overcoming its resistance strength, will deform or break. The intermediate arm can then be easily detached from the detachable end connectors for replacement by a further intermediate arm section and thereby permitting on site repair of the suspension arm assembly.

20 Claims, 5 Drawing Sheets

FIG. 7

SNOWMOBILE FRONT SUSPENSION ARM WITH DISCONNECTABLE INTERMEDIATE SECTION

FIELD OF THE INVENTION

The present invention relates to a suspension arm structure for use in the suspension assembly or recreational vehicles, and particularly but not exclusively, snowmobiles of the type where the suspension arms of the suspension assembly extend laterally of the sides of the frame of the vehicle and thereby subject to damage by objects in its path when the vehicle is in motion.

BACKGROUND OF THE INVENTION

The suspension arm of the present invention was developed particularly for snowmobile front end suspensions but has applications to other type vehicles, for recreational use or other uses. There are various snowmobile types tailored to different riding lifestyles of user persons. Some snowmobile are designed to cruise on packed snow trails and others for use in uncharted terrain off trail where one can ride in deep snow and bush country away from a busy environment. The later being suited for the more adventurous and experienced rider. These snowmobiles commonly have their skis mounted spaced from the sides of the snowmobile to provided added stability and with their suspension usually being more sturdy. Because there are several snowmobile manufacturer each producing a variety of snowmobile types, many different suspension assembly types have been designed and modified over the years. However, such suspension assemblies all utilise suspension arms pivotally mounted between the snowmobile body and the skis which are also equipped with a shock absorber, steering linkage and other mounting accessories.

Snowmobile riding can also be an hazardous sport causing injury to its occupant(s) when there is a lost of control of the machine or when encountering obstacles such as other snowmobiles in motion or terrain obstacles such as large rocks, tree stumps, branches or any article buried under the snow. Such is encountered particularly when riding off the groomed trails in deep snow. Because the suspension arms interconnected between the frame of the snowmobile and the skis are disposed in the lower part of the snowmobile, they are often displaced close to the top surface of non-compact snow on which the skis are displaced. Snowmobile can also travel at high speeds, often in the range of up to 80 miles an hour, and when a rider is enjoying a ride on deep snow in an unknown terrain, the rider often more occupied with the scenery than the terrain immediately in front of the snowmobile and therefore the rider does not have sufficient reaction time to avoid buried obstacles which can impact the suspension arms which are closest to the surface of the snow resulting in damage to the suspension and the risk of serious injury to its user person. When one or more suspension arms of a suspension assembly become damaged, it often results in rendering the snowmobile useless. In such a situation a make-shift repair of the ski support assembly is required to permit the towing of the snowmobile to a location where it can be repaired and only if the damaged part is readily available. Such accidents results in an end of an otherwise enjoyable excursion for the user person as well as other accompanying persons required to tow the damages snowmobile to the user person's road vehicle which is usually provided with a snowmobile trailer. Needles to say, this often results in a sad ending, particularly if the person is on a vacation trip with friends in the back country far from civilisation.

This problem of encounter with buried obstacles capable of causing damage to the snowmobile suspension has been addressed in the past and a possible solution has been proposed, namely to form the suspension arms with a curvature to provide more clearance with the surface of the snow. An example of such solution is described in U.S. Pat. Nos. 7,581,609 and 6,793,030. However, such minimal added clearance has not proven sufficient to resolve the problem of preventing encounters with such hazardous obstacles and concealed under snow and lying in the pathways of the suspension assemblies of the snowmobile vehicle.

SUMMARY OF THE INVENTION

It is a feature of the present invention to provide a vehicle front suspension arm, particularly but not exclusively, for use in a suspension assembly of a snowmobile vehicle and which overcomes the above mentioned disadvantages of the known prior art.

Another feature of the present invention is to provide a front suspension arm formed of an upper arm section, a lower arm section and an intermediate arm section and wherein the intermediate arm section is secured at its opposed ends by end connector for connection between the upper and lower arm sections permitting the intermediate arm to be replaced on site when damaged by obstacles as described above when used in a snowmobile suspension assembly.

A further feature of the present invention is to provide is to provide the sectioned suspension arm of the present invention mounted in at least the lowermost forward position of the suspension assembly of a snowmobile.

Another feature of the present invention is to provide a sectioned suspension arm for use in a snowmobile suspension assembly and wherein an intermediate one of the sections is easily removable to permit replacement when damaged and with such replacement capable of being made on site thereby preventing the disadvantages noted herein above.

According to the above features, from a broad aspect, the present invention provides a vehicle front suspension arm for use in a front suspension assembly of a recreational vehicle. The front suspension arm is comprised of an upper arm section, a lower arm section and an intermediate arm section. The upper arm section has a first and a second end with the first end thereof being an outer free end for pivotal connection to the vehicle frame. The lower arm section has a first and a second end with the first end being a lower free end for connection to a ground surface displaceable support. The intermediate arm is removably connected between the second end of the upper and lower arm sections by detachable end connectors. The intermediate arm section when impacted by objects in its pathway, when the vehicle is in motion and damaged by an impact force of the object, can be removed by the detachable end connectors for replacement of the intermediate arm by a further intermediate arm section and thereby permitting on site repair of the damaged front suspension assembly.

According to a further broad aspect of the present invention there is provided a snowmobile vehicle comprising a frame supported in a rear portion thereof by an endless drive track driven by an internal combustion engine. A pair of skis are secured to the frame by a suspension assembly for supporting a front portion of the frame elevated above a ground support surface. Handlebars are operatively connected to the pair of skis through steering linkages to orient the pair of skis in a desired direction. A suspension assembly supports each ski of the pair of skis laterally spaced from the vehicle frame on a respective side of the vehicle. The suspension assembly includes a shock absorber and suspension arms and wherein at least a lower forward one of the suspension arms is formed by an upper arm section, a lower arm section and an intermediate arm section. The upper arm section has a first and a second end. The first end of the upper arm section is an outer free end adapted for pivotal connection to the frame. The lower arm section has a first and a second end. The first end of the lower arm section is a lower free end adapted for pivotal connection to one of the skis of the pair of skis. The intermediate arm section is removably connected between the second end of the upper and lower arm sections by detachable end connectors. The intermediate arm section when impacted by objects in its pathway, when the vehicle is in motion and when damaged by an impact force of the object, is can be removed by the detachable end connectors for replacement by a further intermediate arm section and thereby permitting on site repair of the damaged suspension arm of the suspension assembly.

According to a still further broad aspect of the present invention there is provided a front suspension arm assembly for a recreational vehicle, such as a snowmobile or an all-terrain vehicle. The suspension arm assembly has at least one suspension arm formed by an upper arm section, a lower arm section and an intermediate arm section. The intermediate arm section is provided with detachable end connectors for connection between the upper and lower arm sections. The intermediate arm section has an inferior structural strength than the upper and lower arm sections. The intermediate arm section when impacted by objects in its pathway, when the vehicle is in motion and when damaged by an impact force of the objects rendering the recreational vehicle inoperative, the intermediate arm can be removed by the detachable end connectors and replaced by a further intermediate arm section and thereby permitting on site repair of the suspension assembly.

DESCRIPTION OF THE DRAWINGS

A preferred embodiment of the present invention will now be described with reference to the accompanying drawings in which.

DETAILED DESCRIPTION OF THE PREFERRED EMBODIMENT

Figure 1:
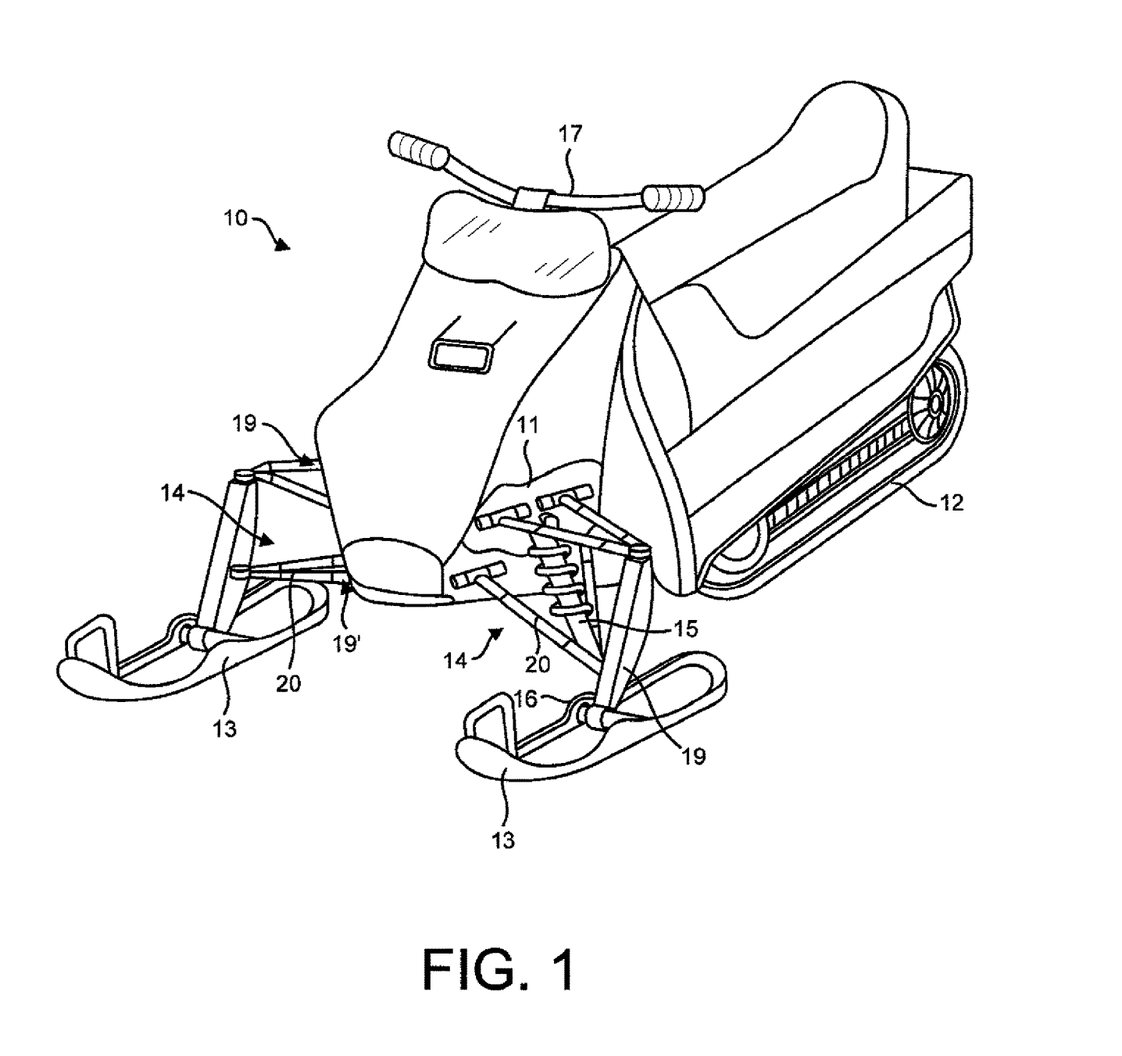
FIG. 1 is a perspective view of a snowmobile illustrating some components of the front suspension system and wherein at least a front lower one of the suspension arm incorporates the sectioned suspension arm of the present invention.

Referring now to the drawings and more particularly to FIG. 1, there is shown generally at 10 a snowmobile vehicle. The snowmobile vehicle 10 is comprised essentially of a frame 11, herein only a portion of it being shown, which extends along the vehicle body as is obvious to a person skilled in the art, and which is supported at its rear end portion by an endless track 12 which is driven by an internal combustion engine, not shown, to propel the vehicle over a ground surface covered with snow. The front portion of the snowmobile is supported elevated by a pair of skis 13 and a front suspension assembly 14. The skis 13 are disposed on respective sides of the snowmobile and spaced from the opposed sides of the snowmobile vehicle to provide increase stability to the illustrated type of snowmobile.

A front suspension assembly 14 is comprised essentially of a shock absorber 15 connected between the vehicle frame and the ski linkages and the front suspension arm assembly 14 which can have a variety of configurations. Handlebars 17 are connected to the ski support structure via linkages, herein only one steering link rod 18 being illustrated, to guide the skis in a desired direction.

The present invention relates to the construction of the suspension arm 16 being formed of segments or sections to permit quick and on site repair of the suspension arm should the arm become damaged by an impact force created by an object in its pathway when the vehicle is in motion over snow and rendering the snowmobile non-functional. Such sectioned suspension arm construction is of use on front suspension assemblies of vehicles, such as snowmobiles or ATV (all-terrain vehicles), where the suspension arm assemblies extend transverse to the travel direction of the snowmobile vehicle where it becomes vulnerable to objects in its pathway and capable of causing damage thereto, as illustrated in FIG. 2 wherein a damaged tubular suspension arm 21 is illustrated.

Figure 2:
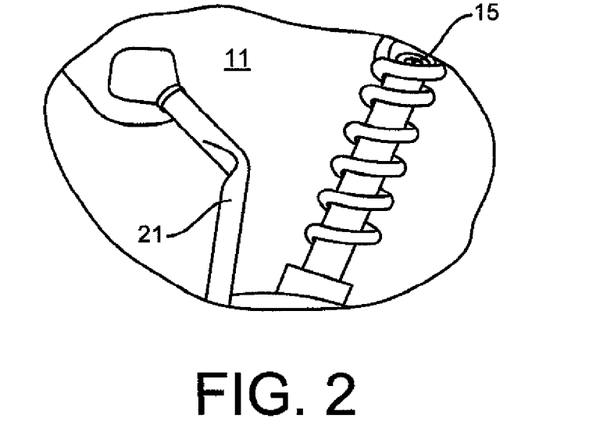
FIG. 2 is a fragmented view showing a damaged tubular suspension arm after impact by an article in its pathway.
Figure 3:
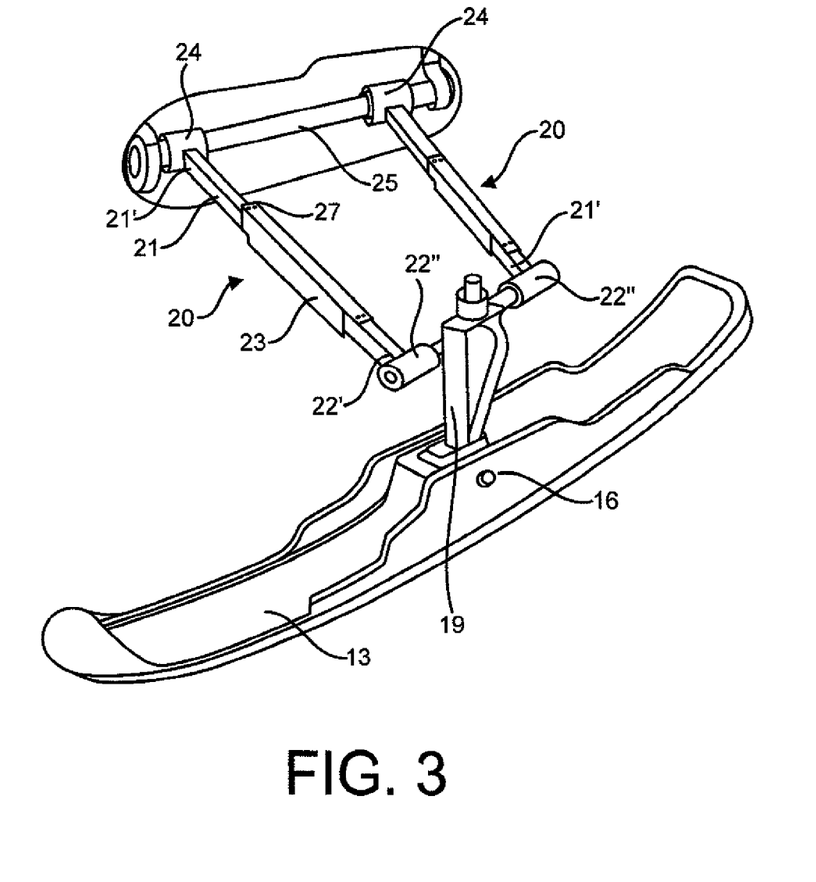
FIG. 3 is a perspective view showing another example of the construction of a suspension arm assembly of a snowmobile incorporating the sectioned suspension arms of the present invention.

The front suspension arm assembly 14, as illustrated in FIG. 1, is a two-tier wishbone type suspension arm structure 19 comprised of an upper tier and a lower tier 19', and wherein the lower tier 19' incorporates the feature of the present invention, and namely, the construction of the suspension arm being segmented in interconnected sections to permit ease of repair of the arm in the event that the arm becomes damaged as illustrated in FIG. 2. As shown in FIG. 2 the front tubular arm 21 has been bent inwards bt impact with a tree stump and rendering the suspension and steering assemblies inoperable and thereby incapacitating the snowmobile from further use. In such a situation, a pleasant outing in the countryside far from transportation and communication, has turned into a nightmare for its rider, particularly when vacationing in a remote area, many miles away from home base. It now becomes necessary to make some form a make-shift repair to secure the ski in a straight forward direction to make it possible to tow the snowmobile to the nearest town or the owner's trailer for transport of the snowmobile in order to have the suspension arm replaced. Because of the many variety of suspension assemblies, such suspension arm may not be readily available, thus terminating an otherwise pleasant snowmobile outing vacation. Because such accidents are frequent to suspensions, with off-the-trail riders, some suspension arms are constructed with an upper bow shape to provide slightly more clearance with the ground surface. However, in deep powdered snow such minimal added clearance has not proven sufficient to avoid such collision. Also, when riding at high speed, frequently the driver does not have ample time to react to obstacles in its path, particularly such articles as stumps, large rocks, branches, etc., hidden under the cover of snow.

With reference now to FIGS. 3 to 5B, the present invention proposes a simple inexpensive solution to the problem as mentioned herein above by constructing of the suspension arm 20 in sections to permit ease of repair on site. Accordingly, the suspension arm 20 is constructed of an upper arm section 21, a lower arm section 22 and an intermediate arm section 23. The upper arm section 21 has an outer end or first end 21' provided with a pivotal connection 24, herein in the form of a tube, for securement to a pivot connection, herein a pivot rod 25, secured to the vehicle frame 26. The lower arm section 22 also has an outer end or a first end 22' terminating with a hollow tube connector 22" for connection to a pivotal rod 28 secured to the arm holder 19 of the ski 13. It is pointed out that the pivot connection may be formed by different pivotal type structures. The intermediate arm 23 is a straight elongated arm provided with end connectors 27, herein formed integral therewith, for connection to respective second ends 21" and 22" of the upper arm section 21 and the lower arm section 22, respectively. It is pointed out that the configuration of the intermediate arm 23 can have a different shape and cross-section to compliment the specific shape and cross-section of the suspension arm depending on the construction of the front suspension assembly, as there are various designs of front suspension assemblies as there are many types of snowmobiles and all-terrain vehicles wherein their ground surface displaceable supports are mounted space outwardly from the sides of the vehicle. Further, the end connectors can be independent connectors as later described herein below.

Figure 4:
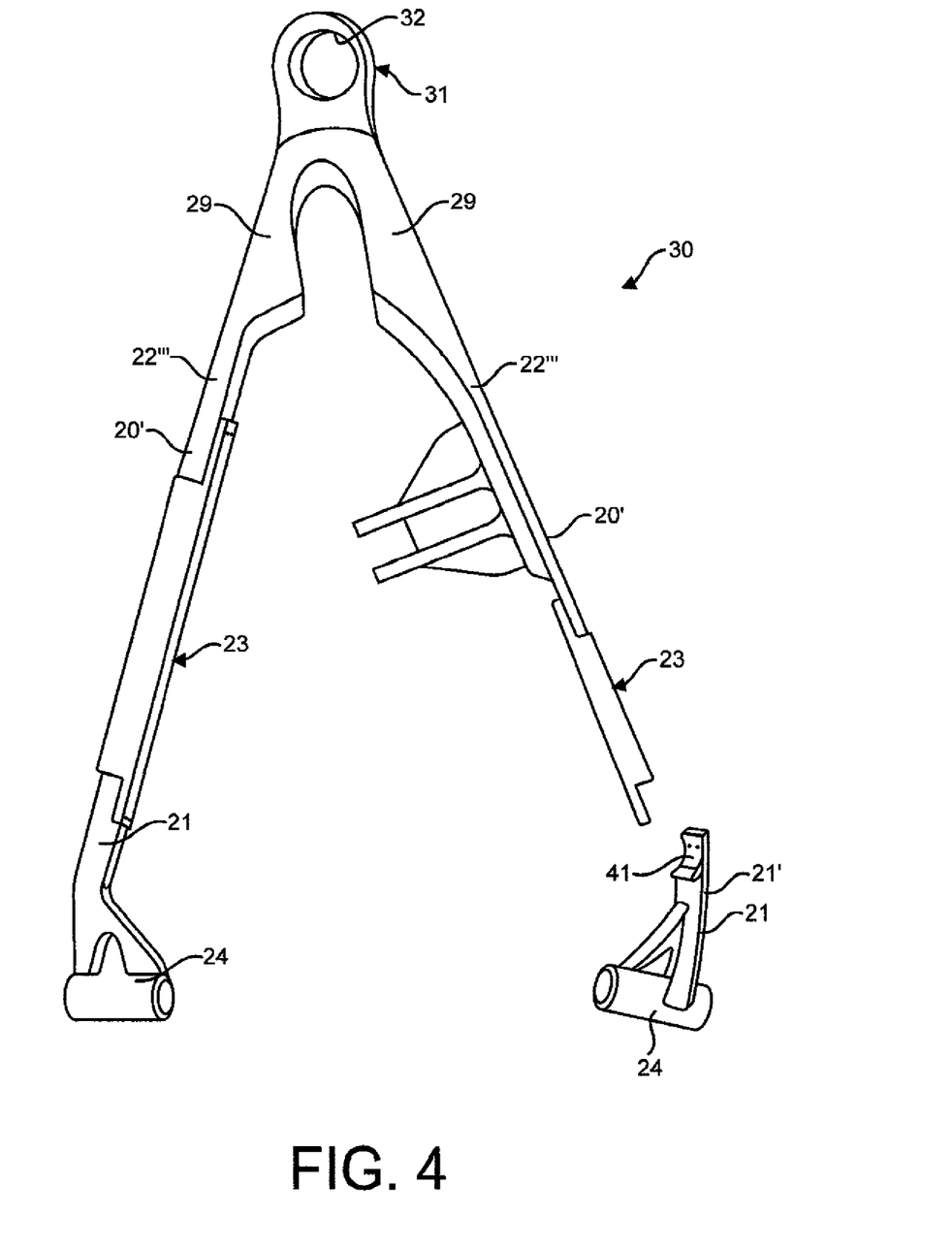
FIG. 4 is a perspective view of a wishbone suspension arm structure incorporating therein the sectioned suspension arm structure of the present invention.

As shown in FIG. 4, there is illustrated a wishbone suspension arm assembly 30 which is constructed with two suspension arms 20 configured in accordance with the present invention and mounted angularly disposed to one another. In this design, the second ends 29 of the lower arm sections 22''' are immovably and angularly interconnected together to a common integrally formed connector 31 formed by a single arm having of a hole 32 formed at a connecting end thereof for detachable mounting on a pivotal attachment secured to a ski arm holder, such as the holder 19 shown in FIG. 1.

Figures 5A, 5B:
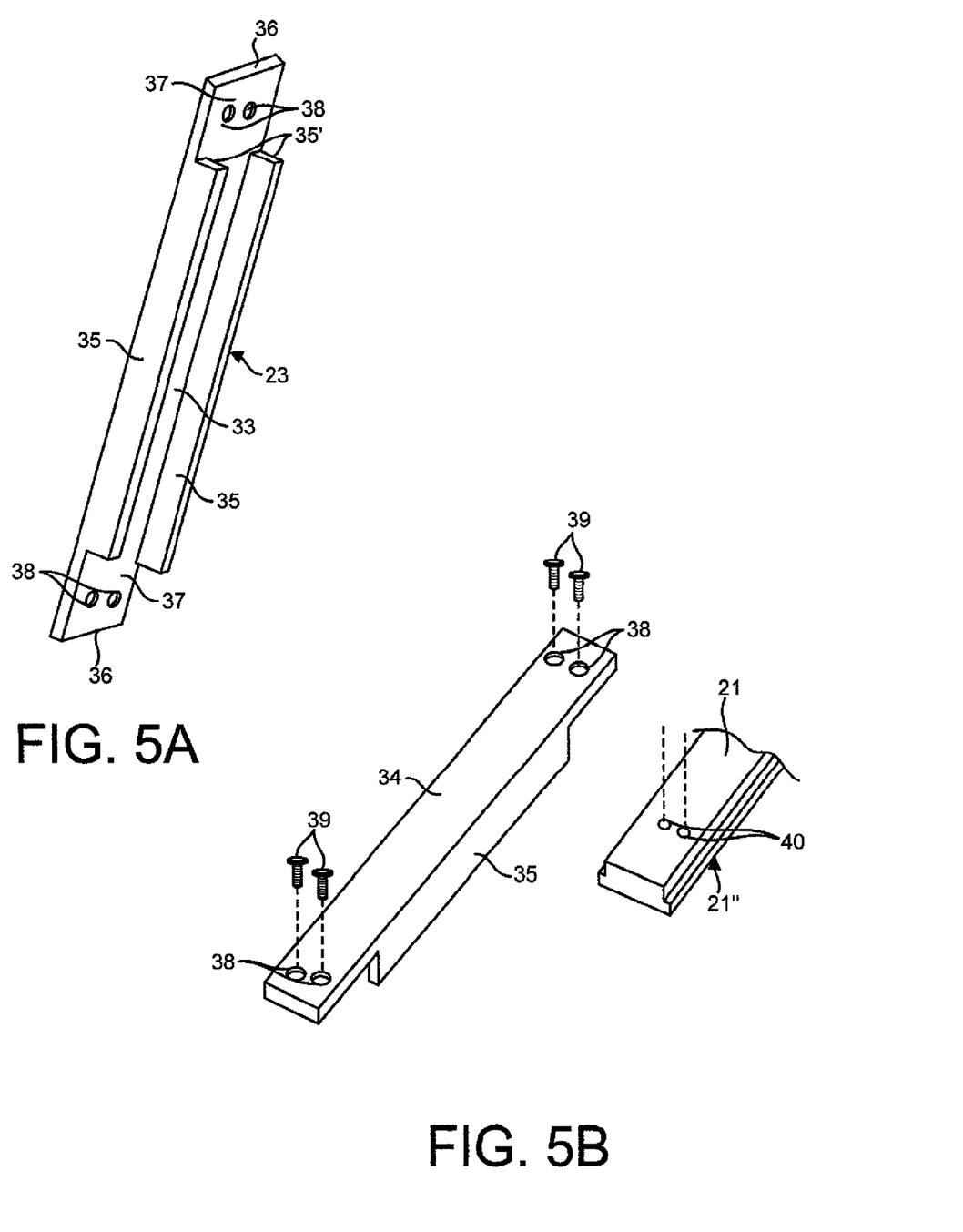
FIG. 5A is a perspective view illustrating one example of the construction of the intermediate arm section of the suspension arm components of the sectioned suspension arm of the present invention.
FIG. 5B is an exploded perspective view illustrating the connection of the intermediate arm section to an upper arm section of the sectioned suspension arm structure.

As shown in FIGS. 5A and 5B, the intermediate arm section 23 is constructed as a straight elongated arm 33 which defines an elongated flat rectangular wall 34 and opposed right angle side walls 35 extending in a common direction to each elongated side of said elongated flat rectangular wall 34. The side walls 35 have opposed ends 35' spaced a predetermined distance inwards from far end edges 36 of the elongated flat rectangular wall 34 whereby the elongated rectangular wall extends beyond the side walls 35 to form a connecting flange 37 at opposed ends thereof. The connecting flanges 37 are provided with holes 38 to receive connecting fasteners, such as bolts 39, for threaded engagement in threaded holes 40 formed at a predetermined location spaced from the connecting free ends of the upper and lower arms sections. FIG. 5B shows the interconnection of the upper arm sections 21 to the intermediate arm section 23.

As shown in the embodiment of FIG. 4, an anti-friction bushing 41 is secured to the mating surface at the free end 21' and 22' of the upper and lower arm sections 21 and 22 to strengthen the connection and reduce wear in the connection with the intermediate section. The upper arms 21 and lower arms 22, as herein illustrated, are steel casted arms and the intermediate arms 23 is formed from aluminum material having a tensile strength or resistance strength inferior to the steel casting parts for the reason that if the suspension arm 20 is impacted by objects in its pathway, when the snowmobile is in motion, the intermediate arm being the weakest link arm will deform to absorb the impact force. Also, the intermediate arm of at least a lower frontal arm of the suspension arms of the suspension assembly is much longer that the upper and lower arm sections, preferably but not exclusively, at least equal in length or more than the length of the upper and lower arm sections. It is then possible to detachable the end connectors 27 for replacement of the damaged intermediate arm section 23 with a spare part arm 23 and thereby permitting quick on site repair of the front suspension arm because of simple connections forming part of the intermediate arm only. The intermediate arm section 23 can also be fabricated from other metals or composite materials or structural plastics or the same type of metal as the upper and lower arm sections but having a different design to constitute the weakest link of the arm while offering adequate resistance to deformation or breakage when impacted by small objects such as small loose objects or branches and will only deform or break when subjected to a predetermined impact force. This impact force is determined by the design of the suspension arm intermediate section which is subjected to test loads in a load testing environment during the construction of the arm sections and the strength of its connectors.

Figure 6:
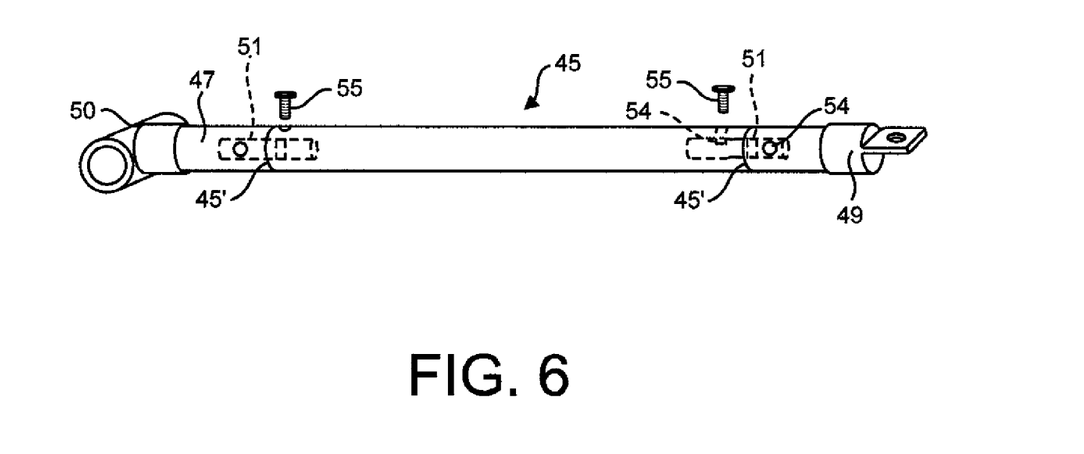
FIG. 6 is a perspective view with the intermediate arm of a tubular suspension arm constructed in accordance with the present invention and wherein the intermediate arm section is secured to the upper and lower arm sections by another example of detachable end connectors.
Figure 7:
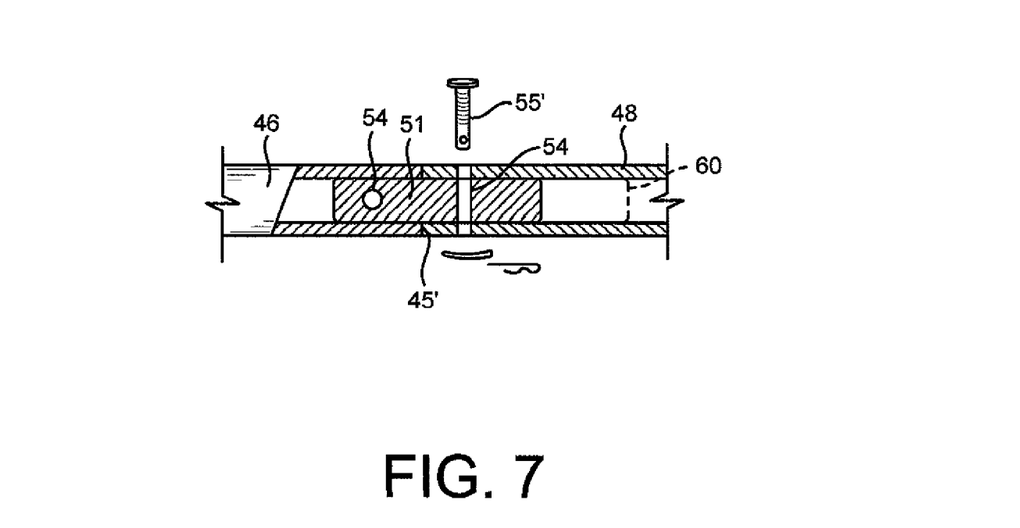
FIG. 7 is a fragmented section view illustrating the interconnection of the arm sections with a further example of the end connectors of FIG. 6.

With reference now to FIGS. 6 and 7, there is illustrated another example of the construction of the suspension arm, herein a tubular suspension arm 45 embodying the feature of the present invention wherein the arm has a detachable and replaceable intermediate tubular section 46 for interconnection between an upper tubular arm section 47 and a lower tubular arm section 48. The outer free ends of the upper and lower tubular arm sections are provided with connectors 49 and 50 for pivotal mounting to the vehicle frame and the skis, as described above with respect to the other embodiments. As herein illustrated, the end connectors for the intermediate section 46 is constituted by a solid rod connector 51, of smaller circular diameter than the tubular arm sections, for close sliding fit in an outer portion of the opposed ends 45' of the intermediate tubular arm 46. The other portion of the rod connector is dimensioned to be received in close sliding fit in the outer ends of the upper and lower tubular arm sections. The rod connector 51 is provided with threaded hole 54, or through bores, to receive bolt fasteners 55 or lock pins 55' and formed at precise locations spaced form opposed ends thereof to secure the tubular arm sections 46, 47 and 48 together.

It is also pointed out, that to achieve a stronger connection of the intermediate arm section with the upper and lower tubular arm free ends, the rod connector 51 may have a longer length extending into the upper and lower tubular arm sections 47 and 48, as illustrated by phantom lines 60 in FIG. 7. Thus, the shorter extension length of the rod connector in the opposed ends of the intermediate arm sections constitutes a weaker connection with the intermediate tubular arm whereby the intermediate tubular arm would constitute the weaker arm section and bend or break when receiving an impact force exceeding the resistance force of the intermediate arm section. To replace a damaged intermediate arm, the fasteners are removed and a replacement intermediate tubular suspension arm is installed. Accordingly, the end connectors of the upper and lower arm sections do not require the removal of their pivotal connections with the vehicle frame and the ski and which connections are more complex and often require special tools. Still further, when dismantling more complex connections in cold weather conditions, and with the connections often covered with ice and snow, one is more apt to loosing small parts of other more complex connections resulting in still further problems.

Many modifications and other embodiments of the present invention as described above will come to mind to a person skilled in the art to which the invention pertains having the benefit of the teachings described herein above and the drawings. Hence, it is to be understood that the embodiments of the present invention are not to be limited to the specific examples thereof as described herein and other embodiments are intended to be included within the scope of the present invention and the appended claims. Although the foregoing descriptions and associated drawings describe example embodiments in the context of certain examples of the elements and members and/or functions, it should be understood that different combinations of elements or substitutes and/or functions may be provided by different embodiments without departing from the scope of the present invention as defined by the appended claims. Furthermore, although specific terms are employed herein, they are used in a generic and descriptive sense only and other equivalent terms are contemplated herein with respect to the items that they relate to. It is therefore within the ambit of the resent invention to encompass all obvious modifications of the examples of the preferred embodiment described herein provide such modifications fall within the scope of the appended claims.

The invention claimed is:

1. A vehicle front suspension arm for use in a front suspension of a recreational vehicle, said front suspension arm comprising an upper arm section, a lower arm section and an intermediate arm section; said upper arm section having a first and a second end, said first end of said upper arm section being an outer free end for pivotal connection to said vehicle frame, said lower arm section having a first and a second end, said first end being a lower free end for connection to a ground surface displaceable support, said intermediate arm section being removably connected by detachable end connectors to said second end of said upper and lower arm sections; said intermediate arm section when impacted by objects in its pathway, when said vehicle is in motion and damaged by an impact force of said object, can be removed by said detachable end connectors for replacement of said intermediate arm section by a further intermediate arm section and thereby permitting on site repair of said front suspension arm.

2. The vehicle front suspension arm as claimed in claim 1 wherein said intermediate arm section has an inferior resistance strength to distortion and breakage as compared to the resistance strength of said first and second arm sections.

3. The vehicle front suspension arm as claimed in claim 2 wherein said intermediate arm section is a straight elongated arm having a predetermined cross-sectional profile and wherein said detachable end connectors are integrally formed at opposed ends of said straight elongated arm.

4. The vehicle front suspension arm as claimed in claim 3 wherein said detachable end connectors are constituted by a connecting end flange formed at said opposed ends of said elongated arm, and removable retention means to secure said connecting flange at opposed ends of said elongated arm to said second ends of said upper and lower arm sections.

5. The vehicle front suspension arm as claimed in claim 4 wherein said removable retention means is provided by fasteners such as bolt fasteners and other suitable fasteners providing removable connection.

6. The vehicle front suspension arm as claimed in claim 4 wherein an anti friction bushing is secured between matting surfaces of said connecting flange and said second end of said upper and lower arm sections.

7. The vehicle front suspension arm assembly as claimed in claim 3 wherein said straight elongated arm is formed of a material shaped to define an elongated flat rectangular wall and opposed right angle side walls extending in a common direction to each elongated side of said elongated flat rectangular wall, said side walls having opposed ends spaced a predetermined distance inwards from opposed ends of said elongated flat rectangular wall whereby said elongated rectangular wall extends beyond said side walls to form a connecting flange at opposed ends thereof, said connecting flanges being adapted for detachable securement to said second end of said upper and lower arm sections.

8. The vehicle front suspension arm as claimed in claim 2 wherein said intermediate arm section is formed from a material having a predetermined tensile strength which is inferior to the tensile strength of each said upper and lower arm sections.

9. The vehicle front suspension arm as claimed in claim 2 wherein said outer free end of said upper arm section is provided with a pivotal connection member for pivotal attachment of said suspension arm assembly to a complimentary suspension attachment immovably secured to a vehicle frame suspension connecting assembly.

10. The vehicle front suspension as claimed in claim 9 wherein said pivotal connection member is a hollow tubular member of circular cross-section, said complimentary suspension attachment being a rod-like member for close fit coupling inside said hollow tubular member.

11. The vehicle front suspension arm as claimed in claim 2 wherein said lower free end of said lower arm section is provided with a connector for securement to an attachment assembly of said ground surface displaceable support.

12. The vehicle front suspension arm as claimed in claim 11 wherein said ground surface displaceable support is one of snowmobile skis and an ail, terrain vehicle wheels or endless belts.

13. The vehicle front suspension arm as claimed in claim 3 wherein there are two of said front suspension arms immovably and angularly interconnected together at their said first end of said lower arm section by a common connector for securement to an attachment assembly of said ground surface displaceable support, said two of said angularly interconnected arm forming a wishbone suspension arm member.

14. The vehicle front suspension arm as claimed in claim 13 wherein said outer free end of said upper arm section of each of said two front suspension arms are provided with a pivotal connection member for pivotal attachment of said two front suspension arms to a stationary pivotal attachment member secured to a vehicle frame suspension connecting assembly.

15. The vehicle front suspension arm as claimed in claim 1 wherein said upper, lower and intermediate arm sections are tubular arm sections, said detachable end connectors being constituted by solid rod connectors dimensioned for close sliding fit in opposed hollow ends of said intermediate arm section and hollow ends of said upper and lower arm sections for abutment end coupling of said upper, lower and intermediated arm sections, and fastening means to immovably engage said solid rod connectors to said upper, lower and intermediate arm sections.

16. The vehicle front suspension arm as claimed in claim 15 wherein said solid rod connectors are of predetermined length and wherein a first portion of said solid rod connectors extends in said hollow end of said intermediate arm section and a second portion extends in said hollow end of an abutting one of said upper and lower arm sections, said first portion being longer than said second portion to provide a more rigid connection of said intermediate arm section with said upper and lower arm sections whereby said damage caused to said intermediate arm section by said impact force will be solely limited to said intermediate arm section and not damage said more rigid connections of said upper and lower atm sections.

17. The vehicle front suspension arm as claimed in claim 15 wherein said intermediate arm has a length substantially equal to the total length of said upper and lower arm sections or more.

18. A snowmobile vehicle comprising a frame supported in a rear portion thereof by an endless drive track driven by an internal combustion engine, a pair of skis secured to said frame by a front suspension for supporting a front portion of said frame elevated above a ground support surface, handlebars operatively connected to said pair of skis through steering linkages to orient said pair of skis in a desired direction, said suspension assembly supporting each ski of said pair of skis laterally spaced from said frame on a respective side of said frame, said suspension assembly including a shock absorber and suspension arms and wherein at least one of said suspension arms is formed by an upper arm section, a lower arm section and an intermediate arm section; said upper arm section having a first and a second end, said first end of said upper arm section being an outer free end for pivotal connection to said frame, said lower arm section having a first and a second end, said first end of said lower arm section being a lower free end for Connection to one of said skis of said pair of skis, said intermediate arm section being connected to said second end of said upper and lower arm sections by detachable end connectors; said intermediate arm section when impacted by objects in its pathway, when said vehicle is in motion and damaged by an impact force of said object, removable by said detachable end connectors for replacement by a further intermediate arm section and thereby permitting on site repair of said front suspension.

19. The snowmobile vehicle as claimed in claim 18 wherein there are two of said suspension arms immovably and angularly interconnected together at their said first end of said lower arm section by a common connector for attachment to a pivotal connection of said ski, said two of said angularly interconnected arm assemblies forming a wishbone suspension arm member, said upper free end of said upper arm section of each of said two suspension arms being provided with a pivotal connection member for pivotal attachment to a stationary rod-like member secured to said frame.

20. A front suspension arm assembly for a recreational vehicle; said suspension arm assembly having at least one suspension arm formed by an upper arm section, a lower arm section and an intermediate arm section said intermediate arm section being connected between said upper and lower arm sections by detachable end connectors; said intermediate arm section having an inferior structural strength than said upper and lower arm sections, said intermediate arm section when impacted by objects in its pathway, when said vehicle is in motion and when damaged by an impact forte of said objects and thereby tendering said recreational vehicle inoperative, said intermediate arm section is removed and replaced by detaching the said detachable end connectors and thereby permitting on site repair of said suspension arm assembly.

* * * * *